United States Patent [19]
Ungar

[11] Patent Number: 6,094,664
[45] Date of Patent: Jul. 25, 2000

[54] METHOD AND APPARATUS FOR OPTIMIZING THE NULL POINTER EXCEPTION IN AN OBJECT-ORIENTED PROGRAMMING ENVIRONMENT WITH STATICALLY TYPED VARIABLES

[75] Inventor: David M. Ungar, Palo Alto, Calif.

[73] Assignee: Sun Microsystems, Palo Alto, Calif.

[21] Appl. No.: 08/865,852

[22] Filed: May 30, 1997

[51] Int. Cl.[7] .................................................. G06F 17/30
[52] U.S. Cl. ........................................ 707/206; 707/200
[58] Field of Search .................................. 707/103, 200, 707/206

[56] References Cited

U.S. PATENT DOCUMENTS

| | | | |
|---|---|---|---|
| 4,757,438 | 7/1988 | Thatte et al. | 364/200 |
| 4,907,151 | 3/1990 | Bartlett | 364/200 |
| 4,920,483 | 4/1990 | Pogue et al. | 364/200 |
| 5,222,221 | 6/1993 | Houri et al. | 395/375 |
| 5,301,288 | 4/1994 | Newman et al. | 395/400 |
| 5,355,483 | 10/1994 | Serlet | 395/650 |
| 5,408,650 | 4/1995 | Arsenault | 395/575 |
| 5,437,027 | 7/1995 | Bannon et al. | 707/103 |
| 5,535,329 | 7/1996 | Hastings | 395/183.11 |
| 5,560,003 | 9/1996 | Nilsen et al. | 707/206 |
| 5,561,786 | 10/1996 | Morse | 395/497.01 |
| 5,566,321 | 10/1996 | Pase et al. | 395/480 |
| 5,848,423 | 12/1998 | Ebrahim et al. | 707/206 |

OTHER PUBLICATIONS

Aho, et al., "Compilers: Principles, Techniques and Tools," Addison–Wesley Publishing Company, pp. 585–607, (1985).

Appleby, Karen, "Garbage Collection for Prolog Based on WAM," Communications of the ACM, vol. 31, Issue 6, pp. 1–20, (Jun. 1, 1988).

Barrett, David A., "Improving Performance of Conservative Generational Garbage Collection," Technical Report CU–CS–784–95, University of Colorado at Boulder (Sep. 1995).

Booch, Grady, "Object Oriented Design with Applications," The Benjamin/Cummings Publishing Company, Inc., pp. 26–71, (1991).

Bott, Ed, "Windows'Invisible Wall: The 64K Barrier," Windows Exam, pp. 210–212, (Mar. 1994).

Caro, Alejandro, "A Novel 64 Bit Data Representation for Garbage Collection and Synchronizing Memory," Computation Structures Group Memo 396, Massachusetts Institute of Technology, (Apr. 9, 1997).

Cohn, et al., "Java Developer's Reference," pp. 1009–1010, Sams.net Publishing, (1996).

Courts, Robert, "Improving Locality of Reference in a Garbage Collecting Memory Management System," Communications of the ACM, vol. 31, No.9, pp. 1128–1138, (Sep. 1988).

Grehan, Rick, "If Memory Serves . . . ," Byte, pp. 279–337, (Aug., 1989).

Grehan, Rick, "Virtually Virtual Memory," Byte, pp. 455–464, (Sep. 1990).

Harbaugh, et al., "HeapGuard, Eliminating Garbage Collection in Real–Time Ada Systems," Integrated Software, Inc., pp. 704–708, (1995).

(List continued on next page.)

Primary Examiner—Wayne Amsbury
Assistant Examiner—Cheryl Lewis
Attorney, Agent, or Firm—Park & Vaughan LLP

[57] ABSTRACT

Apparatus, methods, systems and computer program products are disclosed that improve the efficiency of mutator programs and garbage collection programs that process objects containing null pointers in an object-oriented programming environment with statically typed variables. This improvement is achieved by allocating a NULL object within a controlled access memory area. Access to the NULL object is enabled when garbage collecting nodes and disabled while the mutator accesses the nodes.

20 Claims, 8 Drawing Sheets

OTHER PUBLICATIONS

Hölzle, Urs, "A Fast Write Barrier for Generational Garbage Collectors," Presented at the OOPSLA '93 Garbage Collection Workshop, Washington, D.C., (Oct. 1993).

Imai, et al., "Evaluation of Parallel Copying Garbage Collection on a Shared–Memory Multiprocessor," IEEE Transaction on Parallel and Distributed Systems, vol. 4, No. 9 (Sep. 1993).

Jones, et al., "Garbage Collection: Algorithms for Automatic Dynamic Memory Management," John Wiley & Sons, Ltd., pp. 1–14, (1990).

Kuechlin, et al., "On Multi–Threaded List–Processing and Garbage Collection," Department of Computer and Information Science, Ohio State University, pp. 894–897, (1991).

Moon, et al., "Garbage Collection in a Large Lisp System," Association for Computing Machinery (1984).

Shaw, Richard H., "An Introduction to the Win32 API," PC Magazine, vol.13, No. 4, pp. 291–295, (Apr. 26, 1994).

van der Linden, Peter, "Not Just Java," pp. 156–165, Sun Microsystems, Inc., (1997).

Wallace, et al., "Simple Garbage Collection in G++," Cygnus Support, pp. 1–4. No date.

Wilson, et al., "Dynamic Storage Allocation: A Survey and Critical Review," Department of Computer Sciences, University of Texas at Austin, pp. 1–78. No date.

GC–FAQ—draft, 29 pages, http://www.centerline.com/people/chase/GC/GC–faq.html. No date.

Chung, K–M. and Herbert, Y., "A 'Tiny' Pascal Compiler Part 1: The P–Code Interpreter," *Byte Publications, Inc.* 59–65, 148–155 (1978).

Chung, K–M. and Herbert, Y., "A 'Tiny' Pascal Compiler Part 2: The P–Compiler," *Byte Publications, Inc.* 34–52 (1978).

McDaniel, G., "An Analysis of a Mesa Instruction Set," *Xerox Corporation, Palo Alto Research Centers.* 1–17 (1982).

Mitchell, J.G. et al., "Mesa Language Manual," *Xerox Corporation, Palo Alto Research Centers.* 1–150 (1982).

Pier, K.A., "A Retrospective on the Dorado, A High–Performance Personal Computer," *Xerox Corporation Palo Alto Research Centers.* 252–269 (1983).

Thompson, K., "Regular Expression Search Algorithm," *Communications of the ACM.* 11:(06) 419–422 (1968).

METHOD AND APPARATUS FOR OPTIMIZING THE NULL POINTER EXCEPTION IN AN OBJECT-ORIENTED PROGRAMMING ENVIRONMENT WITH STATICALLY TYPED VARIABLES

BACKGROUND OF THE INVENTION

1. Field of the Invention

This invention relates to the field of computer memory allocation and deallocation. Specifically, this invention is a new and useful method, apparatus, system, and computer program product for processing null pointers in a garbage collected memory within an object-oriented programming environment with statically typed variables that may contain an null pointer.

2. Background

Memory allocation and deallocation techniques have become very important in structured programming and object oriented programming methodologies. Memory allocated from a heap can be used to store information. Within an object-oriented programming paradigm this information is often in the form of an instantiated object. An allocated portion of heap memory is a node. The subsequently described techniques apply to both nodes that contain data and nodes that are instantiated objects. These nodes are explicitly allocated by the program. However, many modern systems use heap-memory garbage collection techniques to recover previously allocated, but no longer used, nodes.

Introduction to Garbage Collection

Computer memory is a resource. Programs cause a computer to perform operations (to execute) based on instructions stored in memory. Executing programs also use memory to store information. This information is often organized into memory resident data structures. These data structures are often linked together by pointers from one structure to another and are often referenced through pointers in static, register and stack variable storage.

Modern programming languages provide facilities for static, stack and heap allocation of memory. Static allocation binds variables to storage locations at compile and/or link time. Stack allocation pushes an activation frame on the processor's stack when a program block prepares to execute. This activation frame contains storage for variables within the scope of execution for the program block executing in the processor. Once the program block completes, the activation frame is popped from stack. Variables stored in the activation frame are not saved from one activation of the block to the next. Heap allocation allows memory for variables to be allocated and deallocated in any order and these variables can outlive the procedure (or block) that created them. Once memory is deallocated it is available for reallocation for another use.

A "node" is an area of memory allocated from a heap. Nodes are accessed through pointers. A direct (or simple) pointer is the node's address in the heap. An indirect pointer (sometimes called a "handle") points to an address in memory that contains the address of the node. More complex pointers exist. Indirect pointers allow nodes to be moved in the heap without needing to update the occurrences of the handle.

The "root set" is a set of node references such that the referenced nodes must be retained regardless of the state of the heap. A node is reachable if the node is in the root set, or referenced by a reachable node. The "reference set" is the set of node references contained in a node. A memory leak occurs when a node becomes unreachable from the root set and is never reclaimed. A memory leak reduces the amount of heap memory available to the program. A garbage node is a node that becomes unreachable from the root set and can be reclaimed.

Heap memory can be used by invoking explicit node allocation and deallocation procedures. However, although a programmer knows when a new node is required, it is often difficult for the programmer to know when a node is no longer reachable. Thus, problems may occur when programmers explicitly deallocate nodes. One of these problems is that it is very difficult to debug memory leaks. Often the design of the application being programmed obfuscates when the programmer can explicitly deallocate memory. Additionally, when one portion of a program is ready to deallocate memory, it must be certain that no other portion of the program will use that memory. Thus, in object oriented programming (OOP) languages, multiple modules must closely cooperate in the memory management process. This, contrary to OOP programming methodology, leads to tight binding between supposedly independent modules.

These difficulties are reduced if the programmer need not explicitly deallocate memory. Automatic garbage collection methods scan memory for referenced nodes and recover garbage nodes—but at a cost. The process of finding and deallocating garbage nodes takes processor resources. Balancing the impact of the garbage collection process on an executing program is important because the primary function of the program may require timely operation, uninterrupted user interaction or be subject to some other real-time constraint.

A mutator program changes (mutates) the connectivity of the graph of active nodes in the heap. In a system using garbage collection, nodes are allocated from the heap as memory is needed by the mutator program. These nodes are not initially reclaimed when they are no longer needed. Instead, when a memory allocation attempt fails or in response to some condition (for example, on expiration of a clock or counter), the mutation phase is paused, the garbage collection phase is automatically invoked and unused memory allocated to garbage nodes is reclaimed for subsequent reuse. The mutation phase resumes after the garbage collection phase completes.

Some garbage collection methods copy (or scavenge) nodes (that is, these methods relocate nodes that appear to be alive from one location in the heap to another location). These methods require a mechanism that allows existing pointers to the original location of the node to be used to access the relocated node. These mechanisms include (among others) updating existing pointers to the node's original location and providing indirect pointers to the new location of the node.

The prior art in garbage collection is well discussed in *Garbage Collection, Algorithms for Automatic Dynamic Memory Management,* by Richard Jones and Rafael Lins, John Wiley & Sons, ISBN 0-471-94148-4, copyright 1996, hereby incorporated by reference as indicative of the prior art.

Object Oriented Programming

Object oriented programming (OOP) is a methodology for building computer software. Key OOP concepts include data encapsulation, inheritance and polymorphism. While these three key concepts are common to OOP languages, most OOP languages implement the three key concepts differently. Objects contain data and methods. Methods are procedures that generally access the object's data. The programmer using the object does not need to be concerned with the type of data in the object; rather, the programmer need only be concerned with creating the correct sequence of method invocations and using the correct method.

Smalltalk, Java and C++ are examples of OOP languages. Smalltalk was developed in the Learning Research Group at Xerox's Palo Alto Research Center (PARC) in the early 1970s. C++ was developed by Bjarne Stroustrup at the AT&T Bell Laboratories in 1983 as an extension of C. Java is an OOP language with elements from C and C++ and includes highly tuned libraries for the internet environment. Java uses garbage collection techniques to manage its heap. Java was developed at SUN Microsystems and released in 1995. The Java environment is also an example object-oriented programming environment with statically typed variables that may contain a null pointer.

Further information about OOP concepts may be found in *Object Oriented Design with Applications* by Grady Booch, the Benjamin/Cummings Publishing Co., Inc., Redwood City, Calif., (1991), ISBN 0-8053-0091-0.

Objects

Objects are instantiated in the heap based on classes that contain the programmed methods for the object. Objects are specialized data structures that generally include data specific to the object and references to procedures that manipulate the data. Instantiated objects contain data (in instance variables) specific to that particular instantiated object. Generally, an object based on a class is instantiated (or constructed) when a node with memory for the object is allocated from the heap, the required information to tie the object to the class is stored in the object, the object is associated with other objects as appropriate and the object's instance variables initialized. Like any data structure, the object may contain instance variables that are used to store pointers. These instance variables are generally initialized to a specified initial value when the object is instantiated.

Figure 1A:
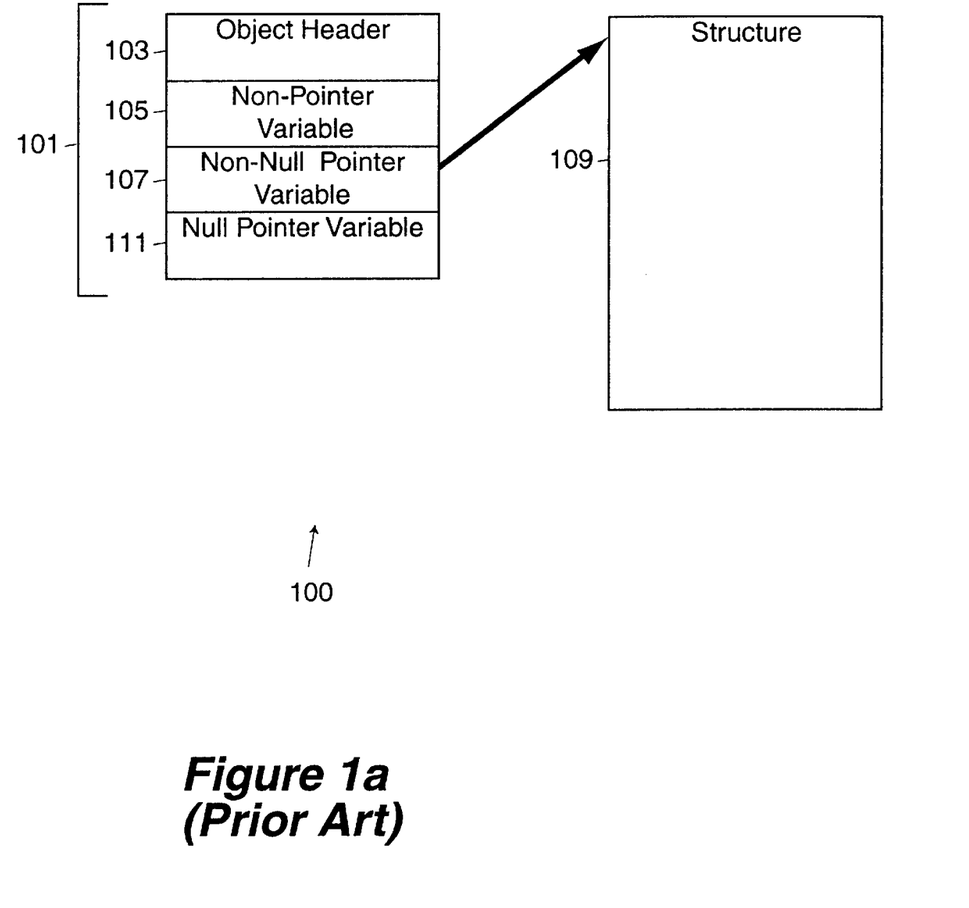
FIGS. 1a–c illustrates the conflicting consequences of prior art definitions of the null pointer between mutator and garbage collection operations.

FIG. 1a illustrates a linked data object, indicated by general reference character 100, that includes a first data object 101. The first data object 101 includes an object header 103 and a 'non-pointer' instance variable 105. The 'non-pointer' instance variable 105 is used to contain data such as an integer or a floating point value. The first data object 101 also includes a 'non-null pointer' instance variable 107 that contains a pointer to a second data object 109. In addition, the first data object 101 also contains a 'null pointer' instance variable 111 that contains a value that is defined to be an invalid pointer. Invalid pointers are commonly defined to be either the ZERO pointer or an address of a NULL object (an identifiable special object located at a specified address). The term "null pointer" refers to whichever of these values is used to define the invalid pointer. The null pointer is often used as a linked object termination indicator such as in a leaf or end object in a linked list or tree. The null pointer is also used to initialize unassigned pointer variables so that an attempted access through an unassigned pointer value can be detected. Thus, pointer variables are generally initialized to the null pointer. These pointer variables are subsequently assigned pointer values that reference nodes in the heap memory. The Java environment, for example, provides facilities for detecting when a reference is attempted through a null pointer and, when this attempt occurs, for raising the NullPointerException. The use of the NullPointerException is described in *Java Developer's Reference*, by Mike Cohn et el., © 1996 by Sams.net Publishing, ISBN 1-57521-129-7, in chapter 22 and at pages 1009–1010.

The Java environment also provides garbage collection facilities. However, as is subsequently described, the two approaches previously described for defining the null pointer have conflicting advantages in object-oriented programming environment with statically typed variables such as the Java environment.

Figure 1B:
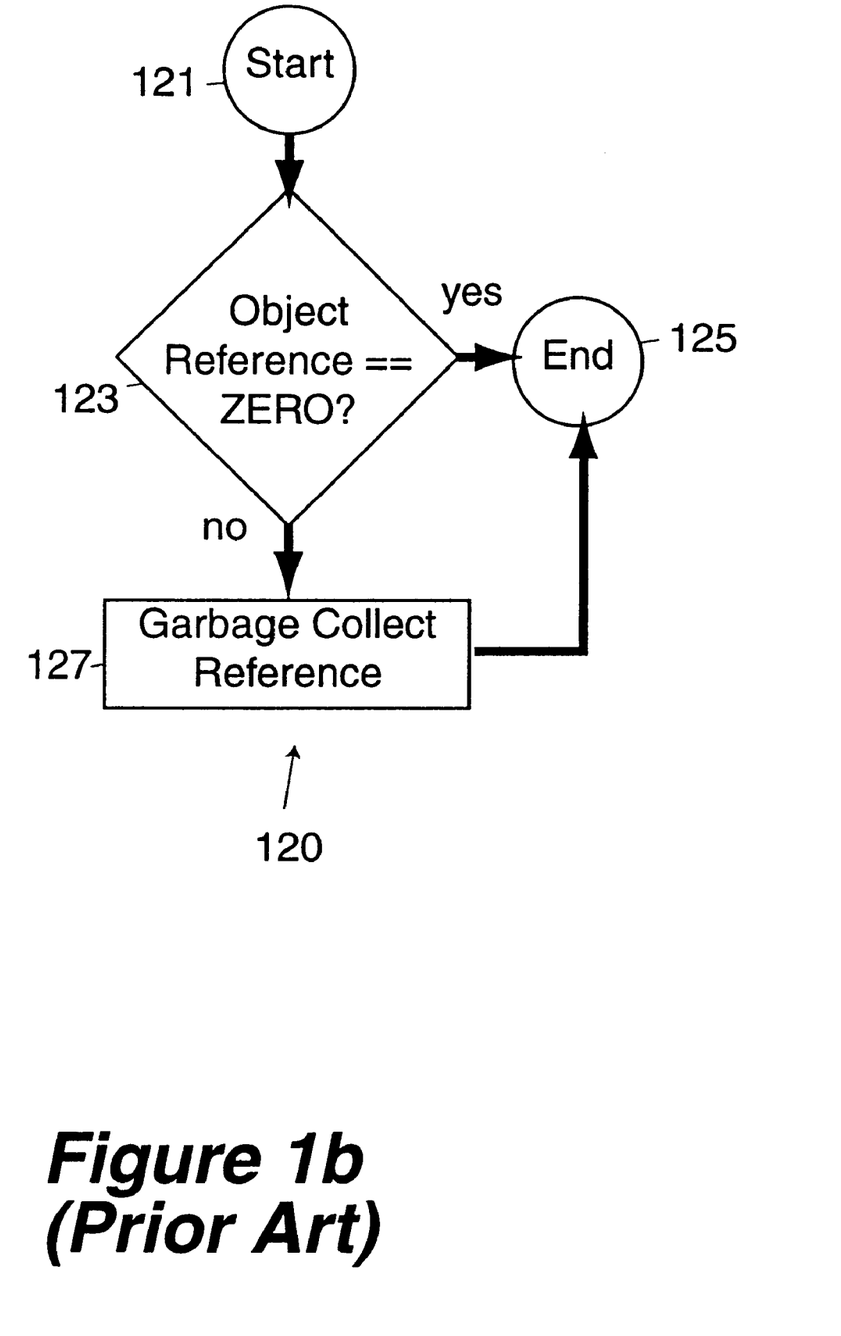

FIG. 1b illustrates a garbage collection process, indicated by general reference character 120, used when the null pointer is defined as the ZERO pointer. The process 120 initiates at a 'start' terminal 121 and continues to a decision procedure 123 that compares the contents of the pointer variable to ZERO. If the content of the pointer variable is ZERO, the process 120 completes through an 'end' terminal 125. Otherwise, the process 120 continues to a 'garbage collect reference' procedure 127 that performs prior art garbage collection operations on the contents of the pointer variable (the reference). The process 120 completes through the 'end' terminal 125 after the 'garbage collect reference' procedure 127 completes.

Those skilled in the art will understand that the decision procedure 123 is executed for every pointer variable. Thus, the process 120 is inefficient as compared to a process that omits the decision procedure 123. The decision procedure 123 can be omitted if the null pointer is defined to be a pointer to a NULL object instead of the ZERO pointer. In this situation, a separate NULL object is allocated and a pointer to the NULL object is used as to indicate link termination and unassigned variables—thus, obviating the need for the decision procedure 123 and improving the process 120. However, as subsequently discussed, this definition of the null pointer adversely affects the mutator.

The Java environment is an example of an object-oriented programming environment with statically typed variables that provides a facility to raise an exception (the NullPointerException in the Java environment) when a memory reference is attempted to an address region near address zero. Thus, if the null pointer is defined as the ZERO pointer, this facility will capture an attempted access through the null pointer. This allows the mutator to access objects through a pointer without explicitly checking that the pointer is the null pointer. Instead, if the mutator attempts to access an object through the null pointer, the Java envrionment will intercept the attempted access and raise the NullPointerException. The mutator either will explicitly handle this exception or will terminate. Other programming environments provide similar capabilities.

Figure 1C:
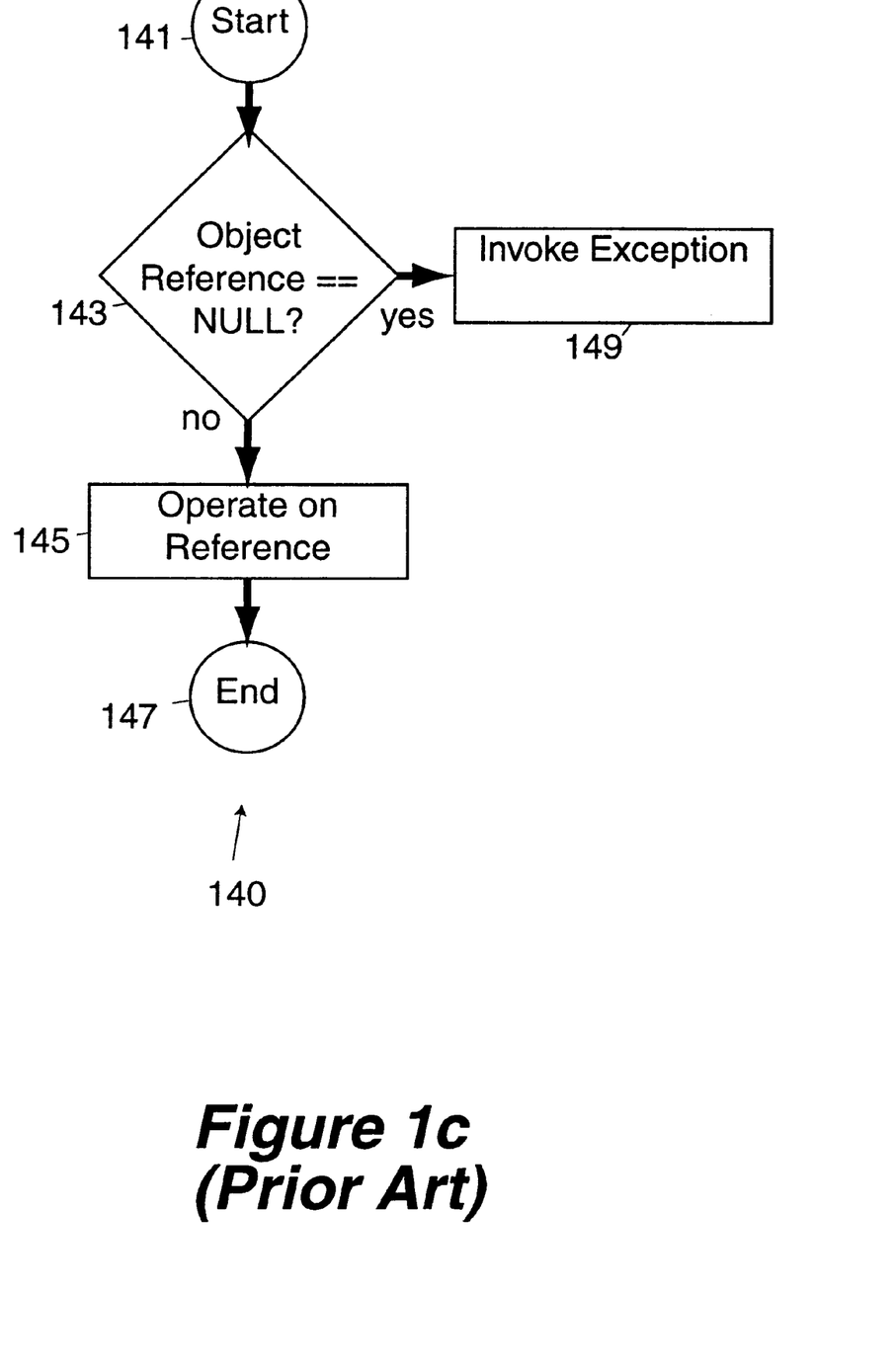

FIG. 1c illustrates a mutator's object reference process, indicated by general reference character 140, used to validate object accesses when the address of the NULL object (instead of the ZERO pointer) is defined to be the null pointer. The mutator's object reference process 140 is invoked whenever an object is accessed by the mutator (that is, whenever the mutator performes an operation on an object and whenever the mutator accesses an object's instance variable). The mutator's object reference process 140 initiates at a 'start' terminal 141 and continues to a decision procedure 143. The decision procedure 143 compares the address of the object being operated on (the value of the pointer) with the address of the NULL object. If the value of the pointer is not the same as the address of the NULL object, the mutator's object reference process 140 continues to an 'operate on reference' procedure 145 that performs the desired operation on the object. Next, the mutator's object reference process 140 completes through an 'end' terminal 147. However, if at the 'operate on reference' procedure 145 the address of the object is the same as the address of the NULL object, the decision procedure 143 continues to an 'invoke exception' procedure 149. The 'invoke exception' procedure 149 invokes a system exception or other operation used to signal that an access has been attempted though a null pointer. Thus, the mutator is less efficient when the address of the NULL object is defined to be the null pointer instead of the ZERO pointer because the decision procedure 143 must be executed at every object reference even though the garbage collection process is more efficient.

Thus, one skilled in the art will understand that although defining the address of a NULL object to be the null pointer improves the efficiency of the garbage collection process, that this definition complicates the mutator's access to objects. Conversely, although using the ZERO pointer as the null pointer improves the efficiency of the mutator it adversely impacts the garbage collection operation. Thus, the problem is to define a null pointer, and an approach for checking accesses through the null pointer, that are efficient for both the mutator's object accesses and the garbage collection process's accesses.

SUMMARY OF THE INVENTION

The present invention provides an economical, apparatus, method, system and computer program product for resolving conflicting efficiencies related to the definition of a null pointer. The previously described problem is addressed by defining the null pointer to be the address of the NULL object. The NULL object is located in a controlled access memory area that can be conditioned to raise an exception on an attempted access. Access to the NULL object is enabled dependent on whether the mutator is accessing the heap or whether the garbage collection process is accessing the heap. One aspect of the invention is a computer controlled method for efficiently accessing a node containing a pointer to a NULL object in an object-oriented programming environment with statically typed variables. The node is subject to garbage collection and access by a mutator. One step in the method is that of allocating a controlled access memory area. The controlled access memory area contains the NULL object at an address. The address is used as the pointer. Another method step is that of controlling the controlled access memory area dependent on whether or not the node is subject to garbage collection during a garbage collection phase.

In yet another aspect of the invention a computer system is disclosed, including a central processing unit coupled to a memory, for efficiently accessing a node containing a pointer to a NULL object in an object-oriented programming environment with statically typed variables. The node is subject to garbage collection and access by a mutator. The system comprises an allocation mechanism and a control mechanism. The allocation mechanism is configured to allocate a controlled access memory area that contains the NULL object. The address of the NULL object is used as the pointer. The control mechanism is configured to control the controlled access memory dependent on whether or not the node is subject to garbage collection during a garbage collection phase.

Another aspect of the invention is an apparatus, including a central processing unit coupled to a memory, for efficiently accessing a node that contains a pointer to a NULL object in an object-oriented programming environment with statically typed variables. The node is subject to garbage collection and access by a mutator. The apparatus comprises an allocation mechanism and a control mechanism. The allocation mechanism is configured to allocate a controlled access memory area that contains the NULL object. The address of the NULL object is used as the pointer. The control mechanism is configured to control the controlled access memory dependent on whether or not the node is subject to garbage collection during a garbage collection phase.

Yet a further aspect of the invention is a computer program product embedded on a computer usable medium for efficiently accessing a node that contains a pointer to a NULL object in an object-oriented programming environment with statically typed variables. The node is subject to garbage collection and access by a mutator. When executed on a computer, the computer readable code causes a computer to effect an allocation mechanism and a control mechanism. Each of these mechanisms having the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

Notations and Nomenclature

The following 'notations and nomenclature' are provided to assist in the understanding of the present invention and the preferred embodiments thereof.

Controlled access memory area—A contiguous address space that is controlled by a memory access controller. The memory access controller is controlled by a program and can be set to enable or disable access to the controlled access memory area. Generally, the memory access controller raises an exception when a prohibited access is attempted. The controlled access memory area is commonly referred to as a "page".

Data structure—An organization of data in memory.

Node—An area of memory allocated from the heap.

ZERO pointer—A pointer value of zero.

Null pointer—the pointer value that is used to indicate unassigned pointer variables and list termination address. The null pointer is generally defined to be the ZERO pointer or the address of the NULL object.

NULL object—An object within a controlled access memory area that is located at an address defined to be the null pointer.

Object—An instantiated object that resides in a node. It generally contains instance variables and a pointer to a class that references the object's methods. An object is a specialized data structure.

Pointer—A value used as an address to a node. By locating pointers to nodes a garbage collection algorithm determines which nodes are live.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing opcodes are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

One skilled in the art will understand that, although the figures and illustrations use a particular bit ordering within the computer memory word, the actual bit ordering is irrelevant to the invention. Further, one skilled in the art will understand that illustrations of data structures in memory start at the lower addressed memory at the top of the structure and extend to higher addressed memory.

Operating Environment

Figure 2:
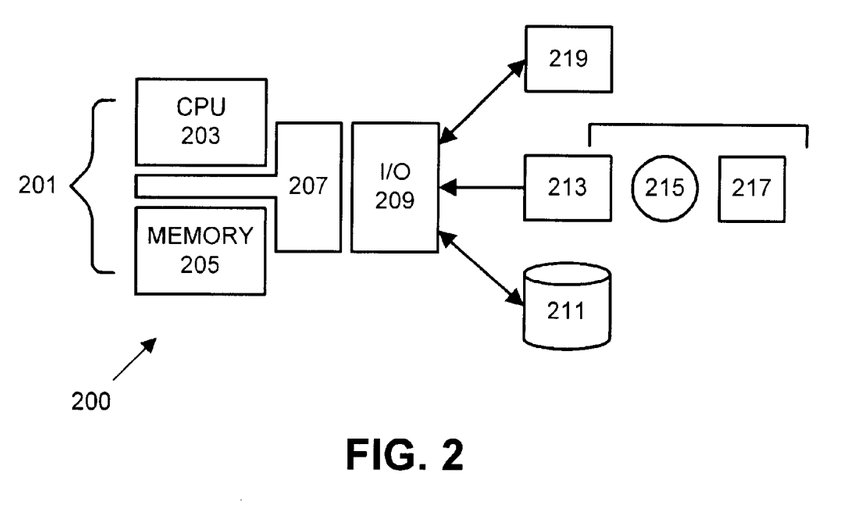
FIG. 2 illustrates a computer system capable of using the invention in accordance with a preferred embodiment.

Some of the elements of a computer, as indicated by general reference character 200, configured to support the invention are shown in FIG. 2 wherein a processor 201 is shown, having a central processor unit (CPU) 203, a memory section 205, a memory access controller 207 and an input/output (I/O) section 209. The input/output (I/O) section 209 is connected to a disk storage unit 211 and a CD-ROM drive unit 213. The CD-ROM drive unit 213 can read a CD-ROM medium 215 that typically contains a program and data 217. A user control device 219 provides a user with controlling access to the computer 200 either directly, through a network or through some other equivalent means. The CD-ROM drive unit 213, along with the CD-ROM medium 215, and the disk storage unit 211 comprise a filestorage mechanism. The memory access controller 207 controls the access to the memory section 205 by the input/output (I/O) section 209 and the CPU 203. The memory access controller 207 provides facilities to map a range of contiguous virtual addresses to a range of contiguous physical memory addresses. The memory access controller 207 also provides facilities to prohibit access to memory and to detect attempted accesses to prohibited areas of memory. Such a computer system is capable of executing programs that embody the invention.

The invention addresses the conflicting aspects of the null pointer definitions, as previously described, by using a pointer to a NULL object contained in a controlled access memory area as the null pointer. Additionally, the invention enables access to the NULL object when performing garbage collection operations and disables or prohibits access to the NULL object when not performing garbage collection operations—thus, resolving the previously discussed conflict. The invention first allocates and initializes the NULL object.

Figure 3A:
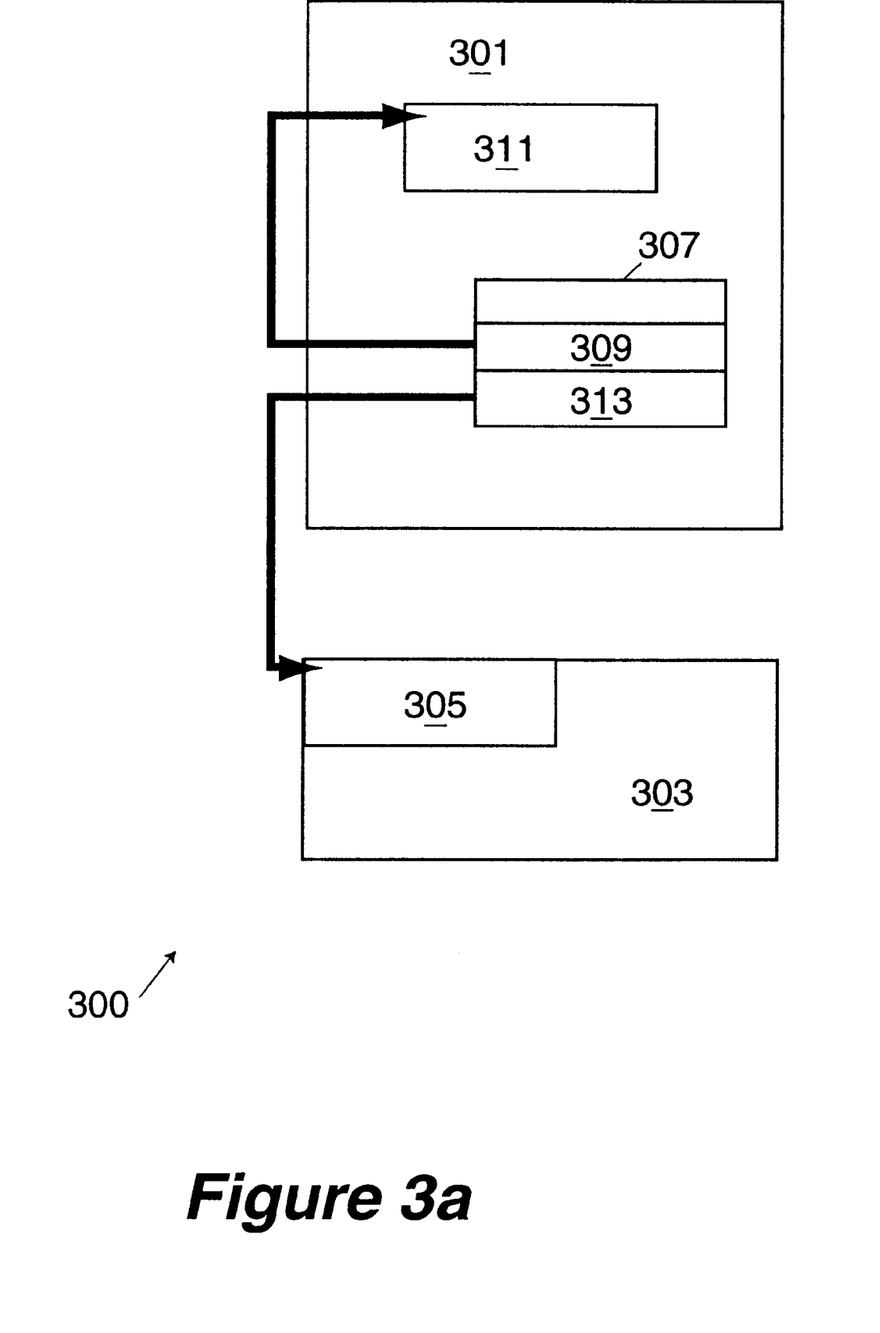
FIGS. 3a–b illustrates a memory structure and its initialization process in accordance with a preferred embodiment.

FIG. 3*a* illustrates a memory allocation map, indicated by general reference character 300, that contains a heap memory area 301 and a controlled access memory area 303. The controlled access memory area 303 is created by an allocation mechanism and includes a NULL object 305. The NULL object 305 contains the minimal required information to identify the object. One skilled in the art will understand that this minimal required information may, but need not, include methods invoked by the garbage collection phase and instance variables that are required to be in the object header. The heap memory area 301 includes a first node 307 that has a first pointer variable 309 that contains the address (a pointer to) a second node 311. The first node 307 also includes a second pointer variable 313 that contains the address of the NULL object 305 in the controlled access memory area 303. One skilled in the art will understand that the first node 307 need not contain both the first pointer variable 309 and the second pointer variable 313 and that both variables were provided to illustrate the differences between them. Further, one skilled in the art will understand that the controlled access memory area 303 and the heap memory area 301 need not be separate. They may be located in contiguous memory address space and differentiated by the operation of the memory access controller 207.

Figure 3B:
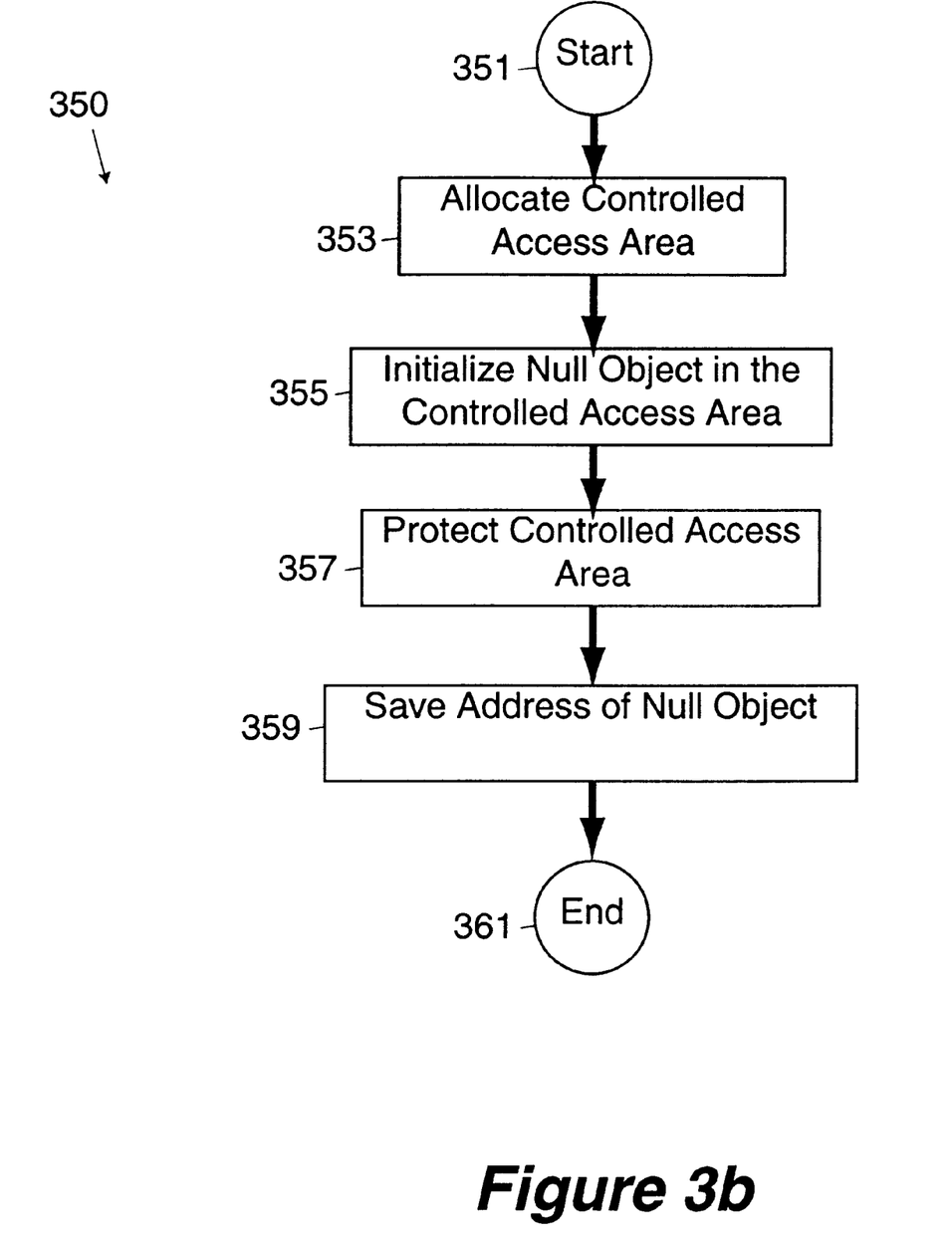

FIG. 3*b* illustrates an initialization process, indicated by general reference character 350, that initiates at a 'start' terminal 351 and continues to an 'allocate controlled access area' procedure 353. The 'allocate controlled access area' procedure 353 allocates a controlled access memory area protected by the memory access controller 207. This controlled access memory area will contain the NULL object pointed to by the null pointer. Once the initialization process 350 has allocated the controlled access memory area, it continues to an 'initialize NULL object' procedure 355 that instantiates the NULL object in the controlled access memory area. Next, the initialization process 350 continues to a 'protect controlled access area' procedure 357 that prohibits access to the controlled access memory area using the control mechanism in the memory access controller 207. When access to the controlled access memory area is disabled, any attempted access to that memory area will cause the memory access controller 207 to raise an exception indicating the attempted prohibited access. After access to the controlled access memory area is disabled, the initialization process 350 continues to an 'save null object address' procedure 359 that stores the null pointer in a pointer variable within the mutator's address space. The null pointer is also often within a node that is subject to garbage collection. Thus, when access to the controlled access memory area is disabled, an attempted access through the pointer variable will cause an exception. However, when access to the controlled access memory area is enabled, such accesses to the controlled access memory area are allowed. Thus, garbage collection algorithms can follow the null pointer as needed. Next, the initialization process 350 completes through an 'end' terminal 361.

Figure 4:
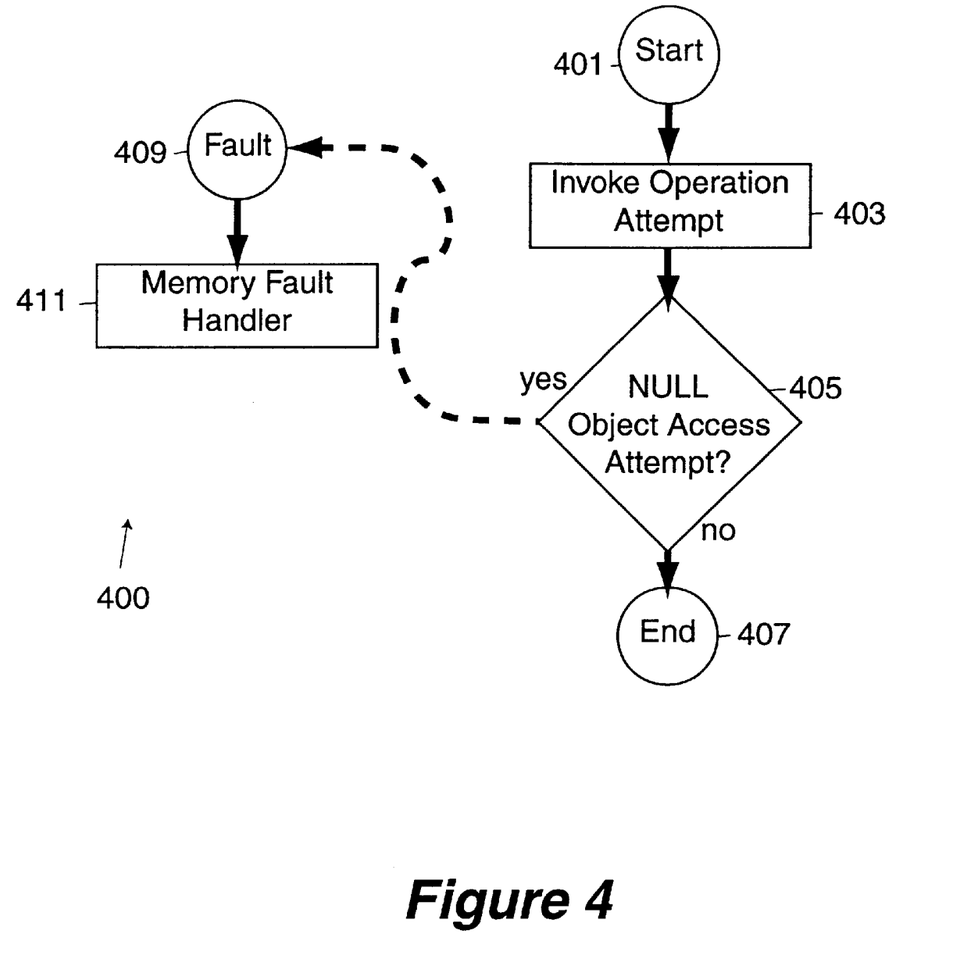
FIG. 4 illustrates the operation of a mutation process that attempts a reference through the null pointer in accordance with a preferred embodiment.

FIG. 4 illustrates a mutator's object access process, indicated by general reference character 400, that initiates at a 'start' terminal 401. The mutator's object access process 400 occurs whenever the mutator operates on an object or object through a pointer. These generalized mutator operations are indicated by an 'attempt operation' procedure 403. A 'NULL object access attempt' detection mechanism 405, using the memory access controller 207, determines whether the operation was attempted on the NULL object. If no attempt was made to access the NULL object, the mutator's object access process 400 completes through an 'end' terminal 407. However, if an attempt was made to access the NULL object, the memory access controller 207 raises an exception signal. The exception signal terminates the attempted memory access. A signal handler is invoked at a 'fault detected' terminal 409 and processing continues to a 'memory fault handler' procedure 411 that processes the exception. This processing is application dependent and includes without limitation aborting the mutator, logging errors, invoking an error handling procedure.

Figure 5:
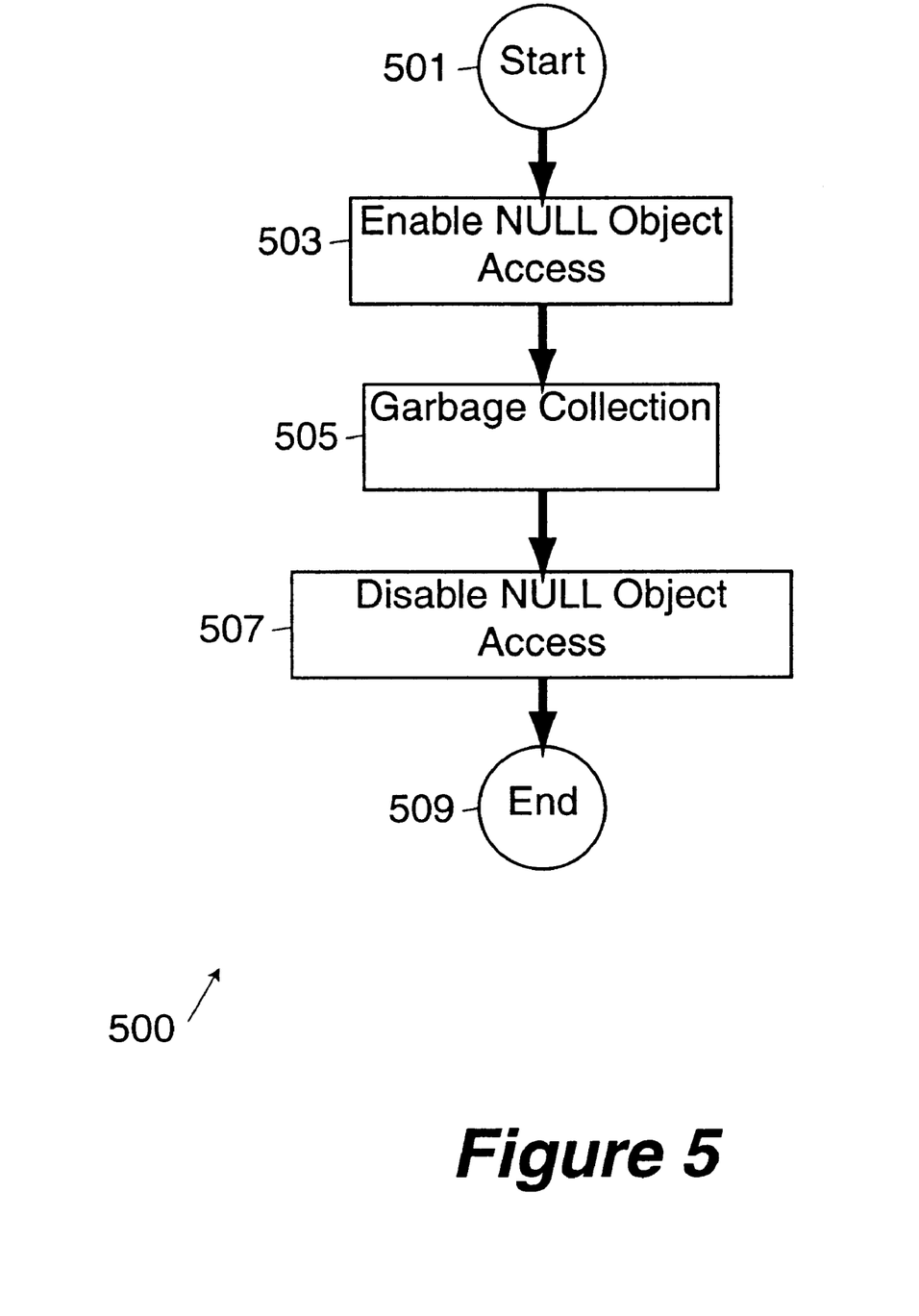
FIG. 5 illustrates the garbage collection process in accordance with a preferred embodiment.

FIG. 5 illustrates a garbage collection process, indicated by general reference character 500, used to enable efficient pointer access to the NULL object. The garbage collection process 500 is invoked during a garbage collection phase that occurs when the mutation phase is paused. The garbage collection process 500 initiates at a 'start' terminal 501 and continues to an 'enable NULL object access' procedure 503. The 'enable NULL object access' procedure 503 uses the memory access controller 207 to enable memory access to the NULL object. Once the NULL object is accessible, the garbage collection process 500 continues to a 'garbage collection' procedure 505 to perform the more efficient garbage collection operation that does not use the decision procedure 123 used in the prior art. The garbage collection process 500 is more efficient because each pointer need not be examined to determine whether it is the null pointer. Instead, the NULL object is processed in the same manner as other objects. After the 'garbage collection' procedure 505 completes, the garbage collection process 500 continues to a 'disable NULL object access' procedure 507 that disables memory access to the NULL object. Completion of the 'disable NULL object access' procedure 507 leaves the memory access controller 207 in the state suitable for prohibiting access to the NULL object during mutation. Finally, the garbage collection process 500 completes through an 'end' terminal 509. The garbage collection phase ends when the garbage collection process 500 completes. The mutation phase can be resumed after the garbage collection phase ends.

One skilled in the art will understand that the invention as previously described teaches a method, system, apparatus and programming product that efficiently provides access to a NULL object during a garbage collection phase while prohibiting access during mutation.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for efficiently accessing a node containing a pointer to a null object in a controlled access memory area in an object-oriented programming environment with statically typed variables, said node subject to garbage collection and access by a mutator, and said method comprising steps of:
   (a) allocating said controlled access memory area containing said null object, said null object having an address used as said pointer;
   (b) disabling access to said controlled access memory area during a mutator access phase so that accesses to said null object are detected in hardware and cause an exception condition without requiring explicit software instructions to test for accesses to said null object; and
   (c) enabling access to said controlled access memory area during a garbage collection phase so that accesses to said null object do not cause the exception condition thereby allowing said garbage collection process to trace down pointer chains without explicitly testing for null pointer values.

2. The computer controlled method of claim 1 wherein step (a) further comprises initializing said null object in said controlled access memory area.

3. The computer controlled method of claim 1 further comprising detecting an attempted access of said null object and causing an exception condition if access to said controlled access memory area has been disabled.

4. The computer controlled method of claim 1 wherein said node contains an object.

5. The computer controlled method of claim 4 wherein said object is a java object.

6. A computer controlled system, having a central processing unit (CPU) and a memory coupled to said CPU, for efficiently accessing a node in an object oriented programming environment with statically typed variables, said node containing a pointer to a null object in a controlled access memory area, said node subject to garbage collection and access by a mutator, wherein said system comprises:
   an allocation mechanism configured to allocate said controlled access memory area containing said null object, said null object having an address used as said pointer; and
   a disabling mechanism that is configured to disable access to said controlled access memory area during a mutator access phase so that accesses to said null object are detected in hardware and cause an exception condition without requiring explicit software instructions to test for accesses to said null object; and
   an enabling mechanism that is configured to enable access to said controlled access memory area during a garbage collection phase so that accesses to said null object do not cause the exception condition thereby allowing said garbage collection process to trace down pointer chains without explicitly testing for null pointer values.

7. The computer controlled system of claim 6 herein the allocation mechanism further comprises an initialization mechanism configured to initialize said null object in said controlled access memory area.

8. The computer controlled system of claim 6 further comprising a detection mechanism configured to detect an attempted access to said null object and to cause an exception condition if access to said controlled access memory area has been disabled.

9. The computer controlled system of claim 6 wherein said node contains an object.

10. The computer controlled system of claim 9 wherein said object is a java object.

11. An apparatus having a central processing unit (CPU) and a memory coupled to said CPU for efficiently accessing a node containing a pointer to a null object in a controlled access memory area in an object-oriented programming environment with statically typed variables, said node subject to garbage collection and access by a mutator, wherein said apparatus comprises:

an allocation mechanism configured to allocate said controlled access memory area containing said null object, said null object having an address used as said pointer; and a disabling mechanism that is configured to disable access to said controlled access memory area during a mutator access phase so that accesses to said null object are detected in hardware and cause an exception condition without requiring explicit software instructions to test for accesses to said null object; and an enabling mechanism that is configured to enable access to said controlled access memory area during a garbage collection phase so that accesses to said null object do not cause the exception condition thereby allowing said garbage collection process to trace down pointer chains without explicitly testing for null pointer values.

12. The apparatus of claim 11 wherein the allocation mechanism further comprises an initialization mechanism configured to initialize said null object in said controlled access memory area.

13. The apparatus of claim 11 further comprising a detection mechanism configured to detect an attempted access to said null object and to cause an exception condition if access to said controlled access memory area has been disabled.

14. The apparatus of claim 11 wherein said node contains an object.

15. The apparatus of claim 14 wherein said object is a java object.

16. A computer program product comprising:

a computer usable storage medium having computer readable code embodied therein for causing a computer to efficiently access a node in a memory, said node containing a pointer to a null object in a controlled access memory area in an object-oriented programming environment with statically typed variables, said node subject to garbage collection and access by a mutator, said computer readable code comprising:

computer readable program code devices configured to cause said computer to effect an allocation mechanism configured to efficiently allocate said controlled access memory area containing said null object, said null object having an address used as said pointer; and computer readable program code devices configured to cause said computer to effect a disabling mechanism that is configured to disable access to said controlled access memory area during a mutator access phase so that accesses to said null object are detected in hardware and cause an exception condition without requiring explicit software instructions to test for accesses to said null object; and computer readable program code devices configured to cause said computer to effect an enabling mechanism that is configured to enable access to said controlled access memory area during a garbage collection phase so that accesses to said null object do not cause the exception condition thereby allowing said garbage collection process to trace down pointer chains without explicitly testing for null pointer values.

17. The computer program product of claim 16 wherein the allocation mechanism further comprises computer readable program code devices configured to cause said computer to effect an initialization mechanism configured to initialize said null object in said controlled access memory area.

18. The computer program product of claim 16 further comprising computer readable program code devices configured to cause said computer to effect a detection mechanism configured to detect an attempted access to said null object and to cause an exception condition if access to said controlled access memory area has been disabled.

19. The computer program product of claim 16 wherein said node contains an object.

20. The computer program product of claim 19 wherein said object is a java object.

* * * * *